United States Patent [19]

Ishikawa

[11] Patent Number: 5,291,303
[45] Date of Patent: Mar. 1, 1994

[54] FACSIMILE APPARATUS
[75] Inventor: Yuji Ishikawa, Yokohama, Japan
[73] Assignee: Canon Kabushiki Kaisha, Tokyo, Japan
[21] Appl. No.: 63,371
[22] Filed: May 19, 1993

Related U.S. Application Data

[63] Continuation of Ser. No. 637,200, Jan. 3, 1991, abandoned.

[30] Foreign Application Priority Data

Jan. 16, 1990 [JP] Japan ................................. 2-4458

[51] Int. Cl.⁵ .............................................. H04N 1/41
[52] U.S. Cl. ..................................... 358/426; 358/432; 358/427
[58] Field of Search ............... 358/426, 417, 432, 434, 358/261.3

[56] References Cited

U.S. PATENT DOCUMENTS

| | | | |
|---|---|---|---|
| 4,568,983 | 2/1986 | Bobick | 358/261.3 |
| 4,608,607 | 7/1986 | Adachi | 358/261.3 |
| 4,799,110 | 1/1989 | Hisada et al. | 358/261.3 |
| 4,839,738 | 6/1989 | Kaku et al. | 358/426 |
| 4,862,282 | 7/1989 | Nakajima | 358/434 |
| 4,937,681 | 6/1990 | Fujinawa et al. | 358/427 |
| 4,939,583 | 7/1990 | Tsuboi et al. | 358/427 |

Primary Examiner—Edward L. Coles, Sr.
Assistant Examiner—Thomas L. Stoll
Attorney, Agent, or Firm—Fitzpatrick, Cella, Harper & Scinto

[57] ABSTRACT

A facsimile apparatus has a first coder for coding image data by a one-dimensional coding method or a two-dimensional coding method, and a second coder for performing coding by a second coding method different from these coding methods. When the amount of code of one line coded by the first coder exceeds a predetermined amount, coding by the first coder is suspended and the image data are coded upon making a changeover to coding by the second coder. In addition, a code resulting from coding by the one- or two-dimensional coding method and a code resulting from coding by the second coding method can be received and decoded.

14 Claims, 9 Drawing Sheets

FACSIMILE APPARATUS

This application is a continuation of application Ser. No. 07/637,200 filed Jan. 3, 1991, now abandoned.

BACKGROUND OF THE INVENTION

1. Field of the Invention

This invention relates to a facsimile apparatus and, more particularly, to a facsimile apparatus in which an image signal can be transmitted upon being coded by different coding methods, and in which the image signal thus coded and transmitted can be decoded and then recorded.

2. Description of the Prior Art

Conventionally, the sending and receiving of image data in a facsimile apparatus is carried out following coding by an MH (modified Huffman) coding method of one dimensional coding, MR (modified READ) coding method of partial two dimensional coding, or MMR (modified MR) coding method which two-dimensionally codes all lines of the image data. Among these, the MH coding method and MR coding method are standardized as coding methods in the G3 group, and the MMR coding method is standardized as a coding method in the G4 group.

However, since the MMR and MR coding methods basically encode correlation between line image data, there is almost no compression effect with regard to image data in which monochrome change points frequently occurs or line image data have little correlation, as in a pseudo half-tone image which relies upon the dither method. Rather, there is an increase in data up to an amount which is a maximum of six times that of the original image data. This is a significant problem in the prior art.

Accordingly, when such image data are transmitted upon being coded by the MMR or MR coding method, there is a large increase in the amount of coded data. As a result, a much longer period of time is required for sending and receiving. Another problem is that an image memory having a large storage capacity is required in order to store the coded image data or the received image data.

SUMMARY OF THE INVENTION

Accordingly, an object of the present invention is to provide a facsimile apparatus in which there is a changeover from a first coding method to a second coding method when the amount of code resulting from coding of one line is large, after which use is made of a coding method which does not depend upon the amount of change points produced in an image, thereby making it possible to reduce the amount of code resulting from the coding of image data having many change points.

According to the present invention, the foregoing object is attained by providing a facsimile apparatus for sending and receiving image data upon compressing the image data, comprising first coding means for coding the image data by a first coding method, second coding means for coding the image data by performing coding by a second coding method different from the first coding method, decision means for deciding whether the amount of code of one line coded by the first coding means is greater than a predetermined amount, and control means for performing control in such a manner that, when it is decided by the decision means that the amount of code resulting from coding is greater than the predetermined amount, coding by the first coding means is suspended and the image data are coded by the second coding means.

Another object of the present invention is to provide a facsimile apparatus in which coding in accordance with a one- or two-dimensional coding method is suspended when the amount of code resulting from the coding of one line is great, after which use is made of a coding method which does not depend upon the amount of change points produced in an image, thereby making it possible to reduce the amount of code resulting from the coding of image data having many change points.

Yet another object of the present invention is to provide a facsimile apparatus in which a predetermined code is inserted between code resulting from coding by a first coding method and code resulting from coding by a second coding method, after which the codes are transmitted, thereby facilitating the discrimination of codes on the receiving side.

A further object of the present invention is to provide a facsimile apparatus in which image data coded by first and second coding methods can be received and decoded.

According to the present invention, the foregoing objects are attained by providing a facsimile apparatus for sending and receiving image data upon compressing the image data, comprising first decoding means for decoding the image data coded by a first coding method, second decoding means for decoding the image data coded by a second coding method different from the first coding method, discriminating means for discriminating a code resulting from coding by the first coding method and a code resulting from coding by the second coding method, and control means for performing control in such a manner that, in dependence upon the results of discrimination made by the discriminating means, a changeover is made between the first and second decoding means to decode the coded image data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the accompanying drawings.

Figure 2:
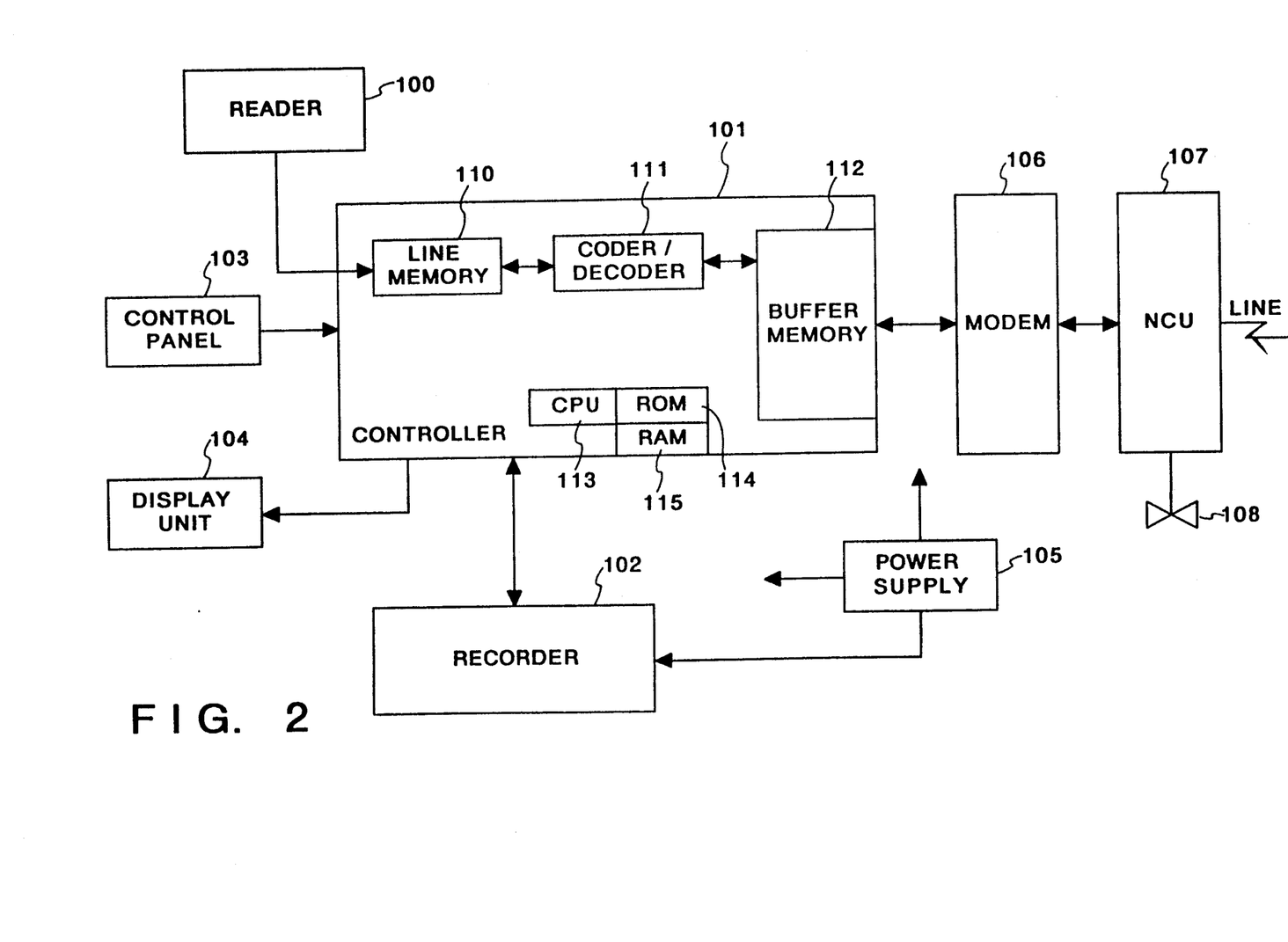
FIG. 2 is a block diagram illustrating the simplified construction of a facsimile apparatus according to the embodiment.

FIG. 2 is a block diagram illustrating the simplified construction of a facsimile apparatus according to the embodiment.

As shown in FIG. 2, the facsimile apparatus includes a reading unit 100 for photoelectrically reading an original and outputting the result to a controller 101 in the form of a digital image signal. Though not shown, the reading unit 100 is equipped with a motor for conveying the original, a CCD image sensor, etc. The controller 101 includes a line memory 110 for storing image data of each line of the input image data. When the original is transmitted or a copy of the original is made, the line memory 110 stores one line of image data inputted from the reading unit 100. When image data are received, the line memory 110 stores one line of image data indicative of the received image data, which have been decoded. The stored data are outputted to a recording unit 102, whereby an image is formed line by line.

The controller 101 includes also a coder/decoder 111 for coding the transmitted image information by MH coding or the like, and decoding received coded image data to convert the same into image data, and a buffer memory 112 for storing coded image data sent or received. These units of the controller 101 are controlled by a CPU 113 such as a microprocessor. The controller 101 is further provided with a ROM 114 and a RAM 115. The ROM 114 is for storing control programs, run by the CPU 113, illustrated by the flowcharts of FIGS. 5 and 6, as well as various data. The CPU 113 executes various control operations (described later) in accordance with the control programs. The RAM 115 is a random-access memory used as the working area of the CPU 113.

The recording unit 102 is equipped with a thermal line head for recording an image on recording paper by a thermosensitive recording method or thermal transfer method. A control panel 103 includes various function designating keys such as a key for starting transmission, and input keys for entering telephone numbers. A display unit 104 ordinarily is provided in the proximity of the control panel 103 and is for displaying various functions, the status of the apparatus, etc. A power supply 105 supplies electric power for the overall apparatus. The facsimile apparatus further includes a modem (modulator/demodulator) 106, a network control unit (NCU) 107 for performing an automatic incoming call operation by detecting a ring-back tone as well as a line control operation, and a telephone set 108.

Figure 1:
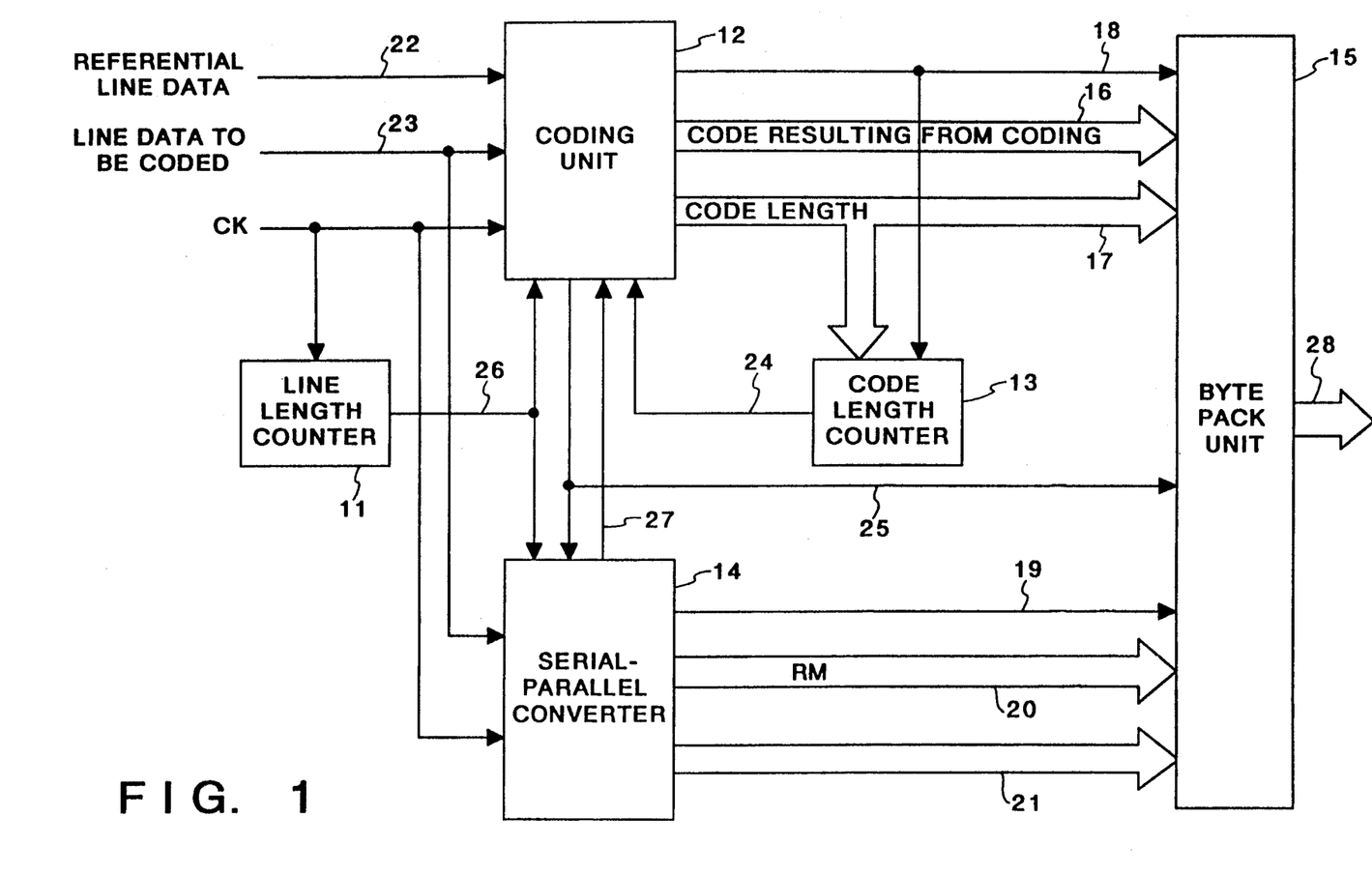
FIG. 1 is a block diagram illustrating the construction of the coding portion of a coding/decoding section of a facsimile apparatus according to an embodiment of the present invention.

FIG. 1 is a block diagram illustrating the simplified construction of a coding circuit contained in the coder/decoder 111 of the facsimile apparatus according to this embodiment.

Numeral 11 denotes a line length counter for detecting the end of one line by counting the number of items of image data in one line of line data 23, which are to be coded, based upon a data clock CK. Serial image data of the line data to be coded enter a coder 12 which, by performing MH or MR coding processing, outputs a code 16, which is the result of coding processing, as well as the code length 17 of this code. In addition, upon being informed by a code length counter 13 of the fact that the total sum of one line of a code resulting from coding has exceeded a predetermined amount, the coder 12 terminates one coding operation currently undergoing processing, then outputs an independent mode starting code (ST1 or ST2, described later), and thereafter ceases coding processing until the end of the pertinent line.

The code length counter 13 adds up the length of the code resulting from the coding performed by the coder 12 and outputted thereby, and thus counts the code length of every line. A serial-parallel converter 14 converts, into seven-bit parallel data, the serially inputted line data 23 to be coded, and outputs eight-bit data (an independent code resulting from coding), in which the eighth bit is made "1". Code patterns 16, 20 and their code lengths respectively outputted by the coder 12 and serial-parallel converter 14 enter a byte pack unit 15, which converts the input into one continuous byte of data and outputs the same as coded data. Numeral 18 denotes a strobe signal which indicates that the code pattern 16 and code length 17 are valid, and numeral 19 a strobe signal which indicates that the independent code 20 and code length 21 are valid.

Numeral 22 denotes reference line data referred to when MR coding is performed. As mentioned above, the line data 23 are the data that are to undergo coding, and the clock CK is the data clock of the line data 23 to be coded. The code length counter 13 outputs an excess-length signal 24, which indicates that one line of the code resulting from coding has exceeded a predetermined length. This signal becomes logical "1" when the amount of coded data of one line surpasses a predetermined value. The coder 12 outputs a coding-stop signal 25 for terminating MH, MR coding and rendering effective the independent coded data outputted by the serial-parallel converter 14. The line length counter 11 outputs a signal 26 indicative of the end of one line. Specifically, this signal indicates the end of one line of the line data 23 to be coded. The byte pack unit 28 outputs coded data 28. These data are outputted upon being packed into byte units.

The coding operation in the coding circuit of this embodiment will now be described taking MR two-dimensional coding as an example.

When the coding of one line starts, MR two-dimensional coding is executed by the coder 12, the resulting code 16 and its code length 17 are outputted every coding operation, and the code 16 and length 17 are inputted to the byte pack unit 15. At this time the code length data 17 are accumulated by the code length counter 13.

If the value in the code length counter 13 exceeds the predetermined value after the foregoing operation has been repeatedly executed, this fact is communicated to the coder 12 by the excess-length signal 24. The coder 12 senses the status of the excess-length signal 24 every coding in a vertical mode or pass mode and whenever there is an end to second run-length coding in a horizontal mode. When it has been confirmed in response to the excess-length signal signal 24 that the code length of one coded line has exceeded the predetermined value, the coder 12 outputs, as the code 16 and code length 17, the independent mode starting code (ST1 or ST2 in FIG. 3), which indicates that the subsequent code is not an MR code.

Thereafter, the coding-stop signal 25 is applied to the serial-parallel converter 14, whereby the latter is instructed to perform coding from this point onward. At the same time, the byte pack unit 15 effects a changeover so that the input thereto of subsequently coded data is switched over from the code 16 and code length 17 to the independent code (RM) 20 and its code length 21, which are outputted by the serial-parallel converter 14.

When the serial-parallel converter 14 has been instructed to perform coding by the coding-stop signal 25, the serial-parallel converter 14 converts the line image data 23 to be coded into a seven-bit parallel signal composed of bits from a 0-th bit to a sixth bit. An eighth bit made logical "1" is attached to form the independent coded data (RM) 20. These data are outputted and enter the byte pack unit 15. A similar operation is thenceforth repeated until the one-line length counter 11 outputs the one-line end signal 26, which indicates that the present line has ended.

When the end of one line has been communicated by the signal 26 from the one-line length counter 11, the serial-parallel converter 14 ends the input of seven-bit data, outputs a code inclusive of the final pixel and issues the signal 27 to inform the coder 12 of the fact that the coding of one line has ended.

As a result, the coder 12 nullifies (turns off) the coding-stop signal 25 and outputs the code of an end-of-line signal EOL as the code 16 as well as the code length 17 of this code. Then, the line length counter 11 and code length counter 13 are reset again to start the coding of the next line.

Figure 3:
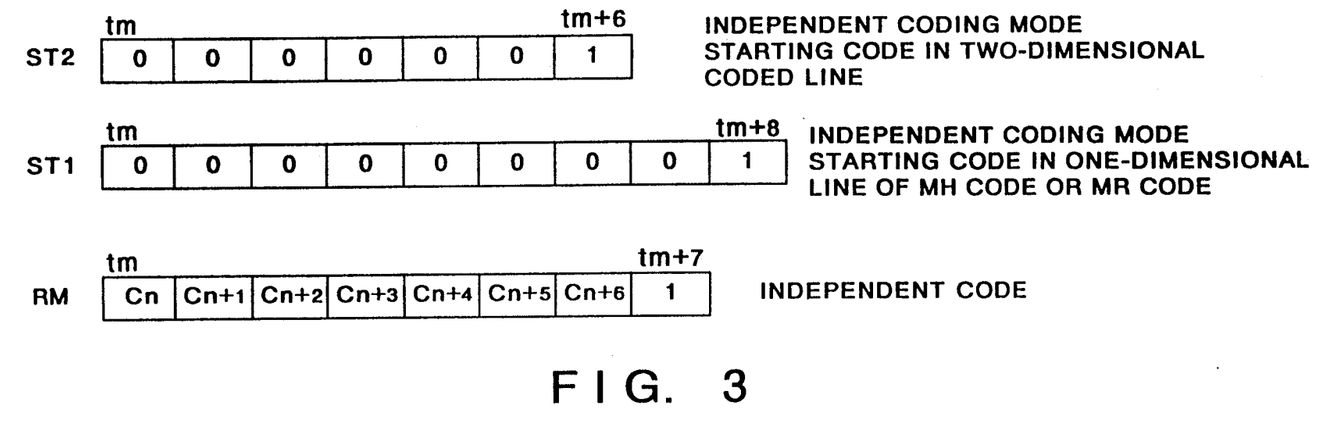
FIG. 3 is a diagram illustrating examples of starting codes of independent code modes and an example of an independent code.

FIG. 3 illustrates examples of code formats of the independent mode starting codes (ST1, ST2), which indicate a transition from MH, MR coding to the independent coding mode shown in FIG. 1, and of the independent coding code (RM).

ST2 is an independent mode starting code used in a case where a coded line is a two-dimensional coding mode of an MR code. ST1 is an independent mode starting code used in a case where a coded line is a one-dimensional coding mode of an MR code, or in case of MH coding. RM is the format of an independent code outputted, following the independent mode starting code (ST1 or ST2), as a result of coding performed by the serial-parallel converter 14. Here a "1" is inserted in the seven bits of the image data.

Figure 4:
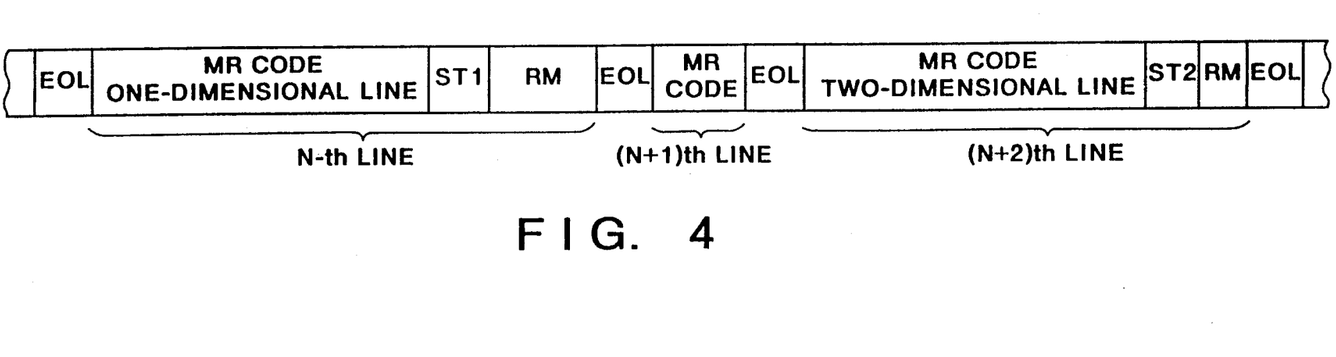
FIG. 4 is a diagram illustrating an example of a data string obtained by coding image data in the embodiment.

FIG. 4 is a diagram illustrating an example of coded data obtained as a result of coding performed by the facsimile apparatus of this embodiment.

An N-th line is coded by MR one-dimensional coding. Since the amount of code is greater than a predetermined amount, the independent mode starting code (ST1) is subsequently inserted. This is followed by the independent mode code (RM).

In an (N+1)th line, the coding of one line ends before the amount of data due to an MR code reaches the predetermined amount. Consequently, this line is composed solely of the MR code.

Since an (N+2)th line is an MR two-dimensional code, the ST2 code is used when the length of the coded data exceeds the predetermined length. This is followed by coding in accordance with the independent mode code (RM), just as in the N-th line.

Figure 5A:
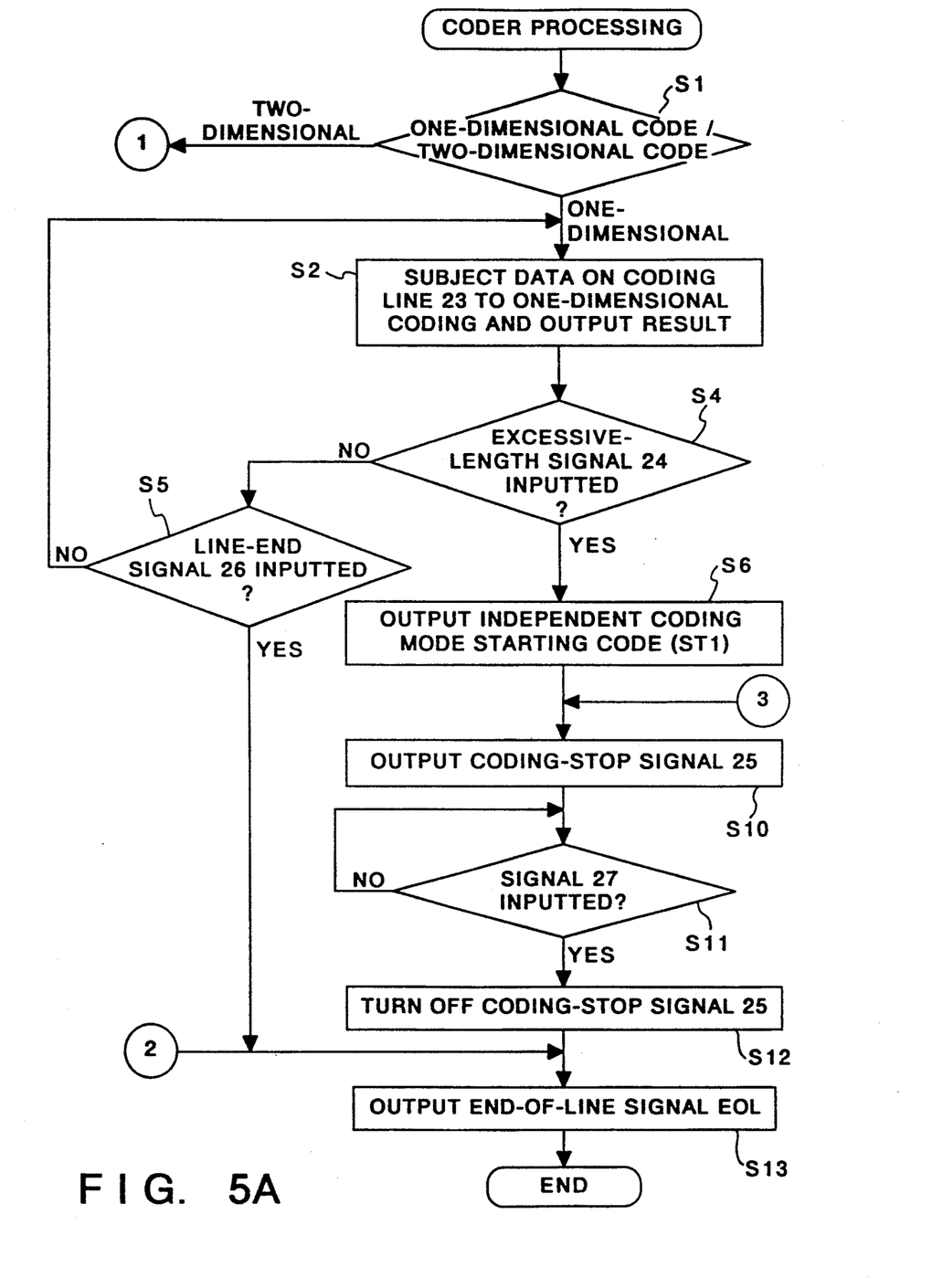
FIG. 5A and 5B are flowcharts illustrating coding processing performed by the coding portion of the facsimile apparatus of the embodiment.
Figure 5B:
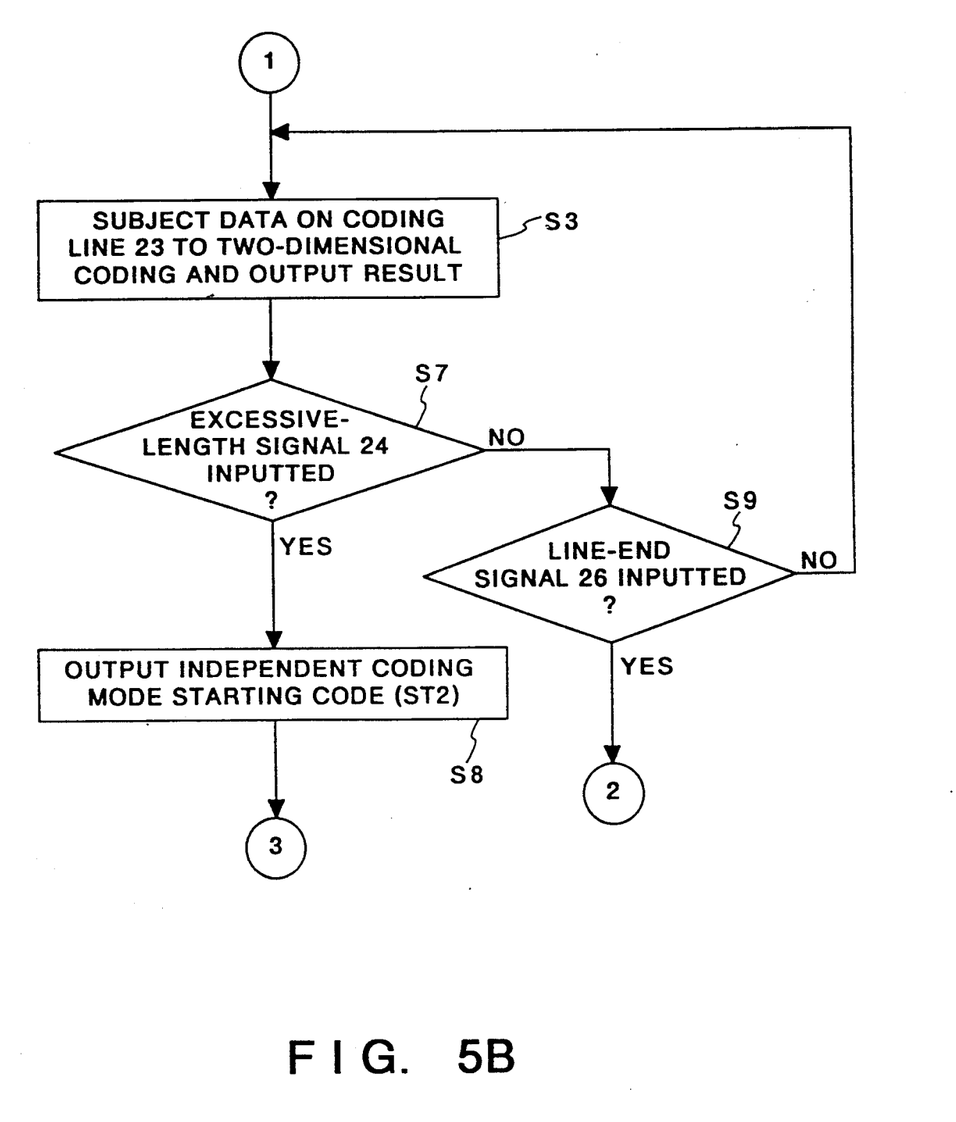

FIG. 5 is a flowchart illustrating the coding processing of one line in the coder 12 of this embodiment.

Step S1 of the flowchart calls for a decision as to whether coding is to be performed by one-dimensional coding or two-dimensional coding. In case of one-dimensional coding, the program proceeds to step S2, where the line data 23 to be coded is subjected to one-dimensional coding and then delivered to the byte pack unit 15. In case of two-dimensional coding, on the other hand, the program proceeds to step S3, where the line data 23 to be coded is subjected to two-dimensional coding and then delivered to the byte pack unit 15.

Next, at step S4 or S7, it is determined whether the excessive-length signal 24 has entered from the code length counter 13. If the signal 24 has not entered, the program proceeds to step S5 or S9, where it is determined whether the line-end signal 26 has entered from the line length counter 11. If the signal 26 has not entered, then the program returns to step S2 or step S3, where the foregoing coding processing is continued.

On the other hand, if it is found at step S5 and S9 that the line-end signal 26 has entered before the excessive-length signal 24 from the code length counter 13, the program proceeds to step S13, at which the EOL code indicating the end of the line is outputted to terminal the coding processing of one line.

If it is determined at step S4 or step S7 that the excessive-length signal 24 has entered, then the independent mode starting signal ST1 (in case of MR one-dimensional coding) is outputted at step S6 or the independent mode starting signal ST2 (in case of MR two-dimensional coding) is outputted at step S8, after which the program proceeds to step S10. Step S10 calls for the coding-stop signal 25 to be delivered to the serial-parallel converter 14. This is followed by step S11, at which the system determines whether the coding of one line has ended, which is indicated by arrival of the signal 27 from the serial-parallel converter 14. When the end of the coding of one line has been detected in response to arrival of the signal 27, the program proceeds to step S12, at which the coding-stop signal 25 is turned off. Then, at step S13, the code of the end-of-line signal EOL is outputted and processing is terminated.

Figure 6:
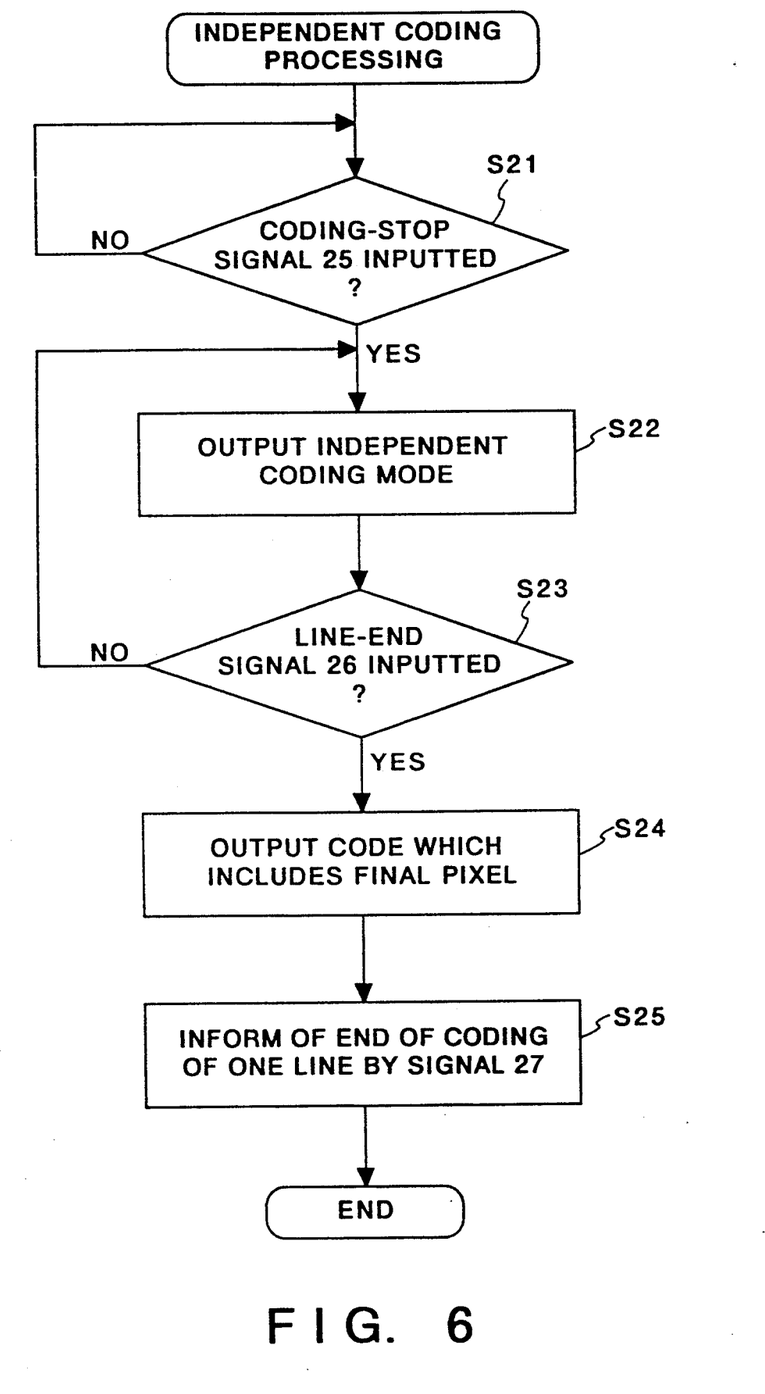
FIG. 6 is a flowchart illustrating coding processing in a serial-parallel converter.

FIG. 6 is a flowchart illustrating the coding processing performed in the serial-parallel converter 14.

This processing is started in response to entry of the coding-stop signal 25 from the coder 12 at step S21. The program then proceeds to step S22, at which the line data 23 to be coded are coded by the independent coding mode (RM) 10, with the coded result being delivered to the byte pack unit 15. This is followed by step S23, at which it is determined whether the line-end signal 26 has entered from the line length counter 11. If the signal 26 has not entered, the program returns to step S22 and coding processing is continued.

If the line-end signal 26 has been found to enter at step S23, then the program proceeds to step S24, where the code containing the final pixel is outputted to the byte pack unit 15, and then to step S25, at which the coder 12 is informed by the signal 27 of the fact that the coding of one line has ended. As a result, the steps S12–S13 of FIG. 5 are executed in the coder 12.

Figure 7:
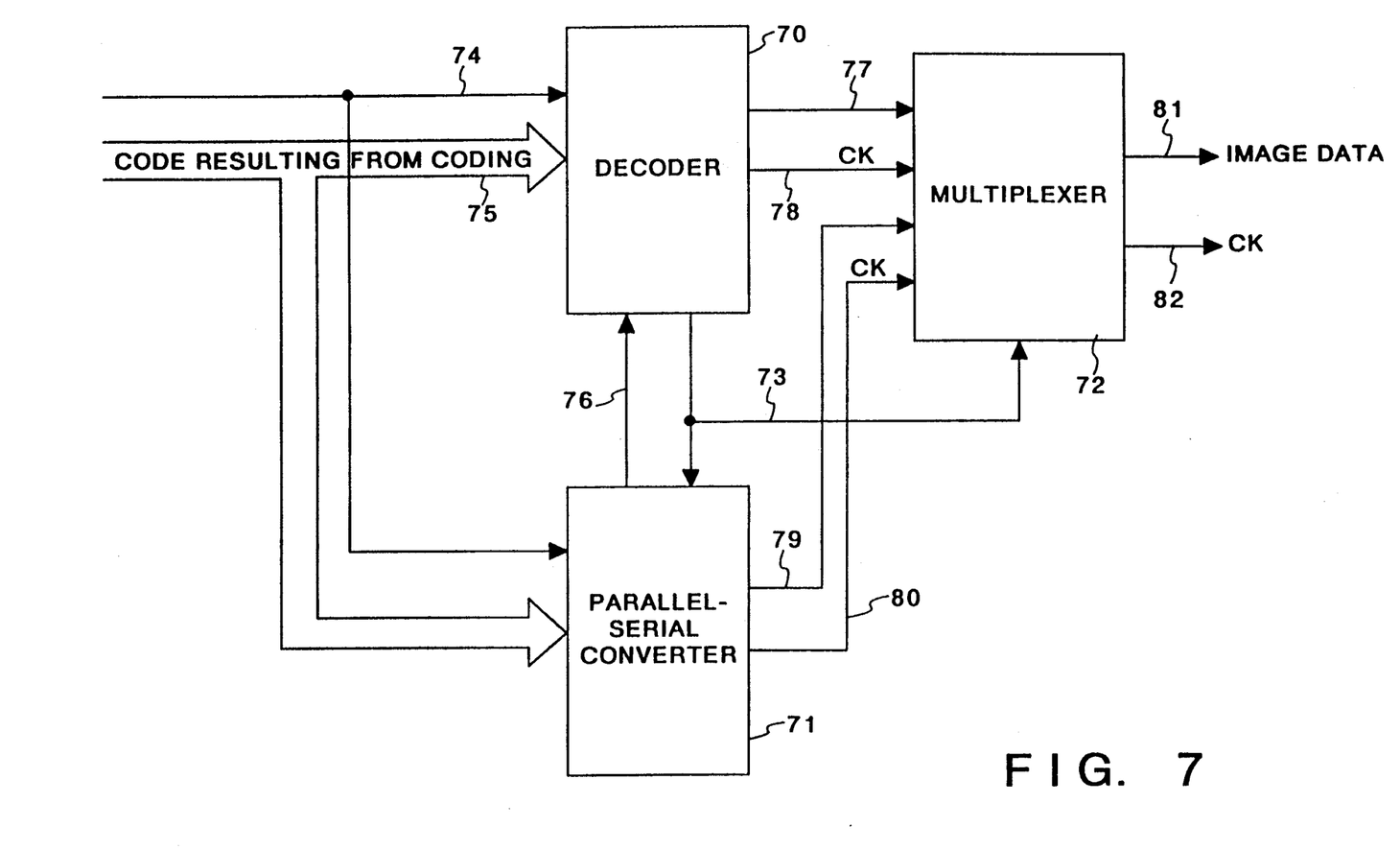
FIG. 7 is a block diagram showing the construction of a decoding portion in the coding/decoding section of the facsimile apparatus of the embodiment.

FIG. 7 is a block diagram showing the simplified construction of a decoder circuit in the coder/decoder unit 111 of the facsimile apparatus according to the present embodiment.

As shown in FIG. 7, the decoder circuit includes a decoder 70 to which code data 75 resulting from coding and a synchronizing clock signal 74 are applied as inputs. The decoder 70 performs the decoding processing of an MH or MR code and outputs image data 77, which are the result of decoding, and a data clock signal 78. Upon receiving the ST1 code or ST2 code as an input thereto, the decoder 70 outputs a decoding-stop signal 73 to end the decoding of the line currently undergoing processing, and thereafter outputs an operation-start command to a parallel-serial converter 71 which decodes the independent code. Thereafter, processing for decoding up to the end of the line is suspended until entry of a line-end signal 76, which indicates the end of one line, from the parallel-serial converter 71.

The parallel-serial converter 71 decodes the independent code data (RM), which enter in parallel fashion, into the original image data, converts the latter into a serial signal and outputs the serial signal to a multiplexer 72. The latter selects either the decoder 70 or the parallel-serial converter 71 to obtain from it the outputted image data and data clock and deliver these as decoded image data 81 and a clock signal CK 82, respectively. More specifically, image data 79 and its clock signal 80 are selected from the parallel-serial converter 71 and delivered when the decoding-stop signal 73 is ON, and image data 77 and its clock signal 78 are selected from the decoder 70 and delivered when the decoding-stop signal 73 is OFF.

The decoding processing in the decoder of this embodiment will now be described with reference to the flowcharts of FIGS. 8 and 9.

Figure 8:
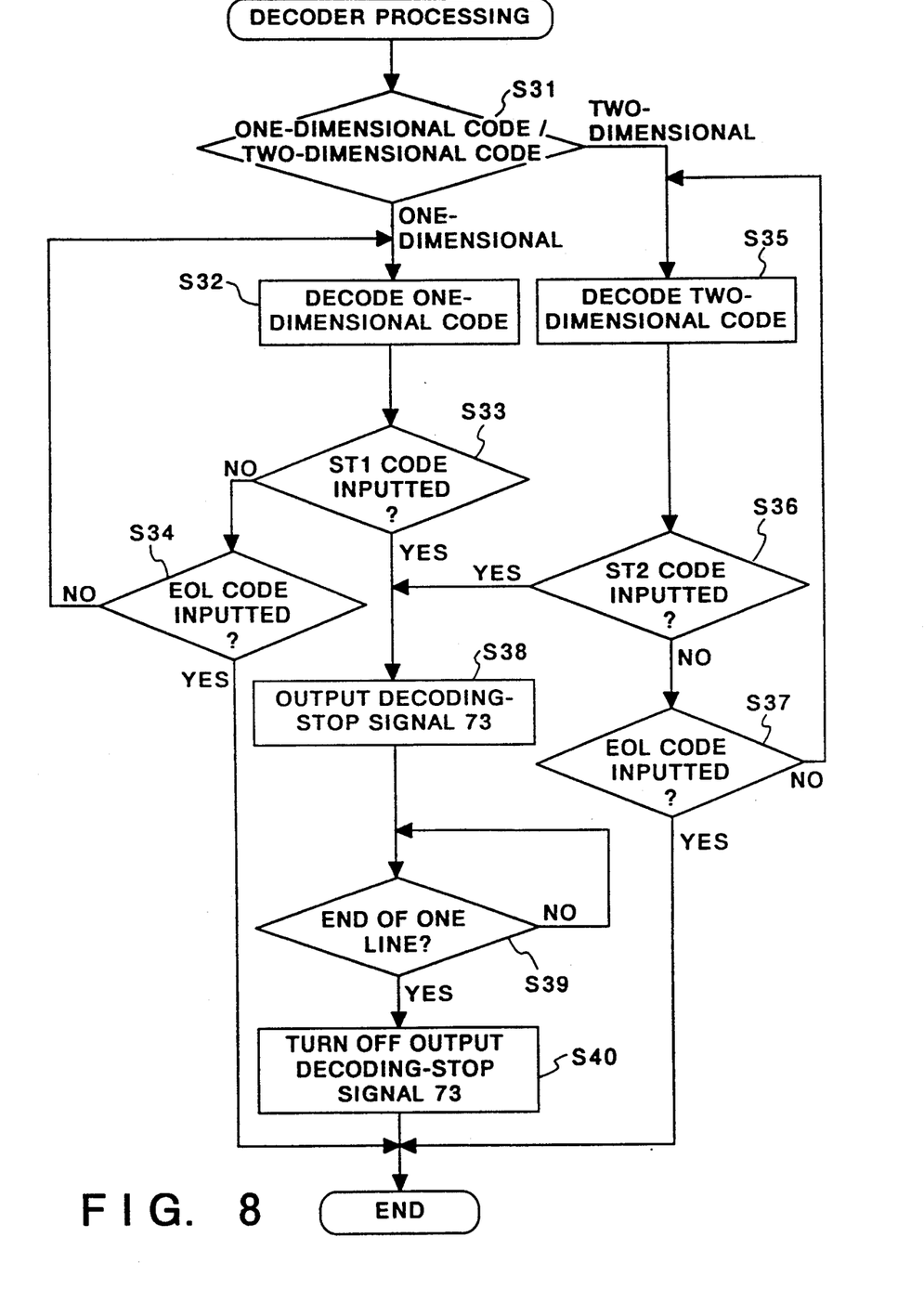
FIG. 8 is a flowchart showing decoding processing performed by the decoding portion of the facsimile apparatus according to the embodiment.

FIG. 8 is a flowchart showing processing for the decoding of one line in the decoder 70 of this embodiment.

Step S31 calls for a decision as to whether decoding is performed in accordance with a one-dimensional code or a two-dimensional code. In case of decoding of a one-dimensional code, the program proceeds to step S32, where decoding processing of a one-dimensional code is performed. In case of a two-dimensional code, on the other hand, the program proceeds to step S35, where decoding processing of a two-dimensional code is performed.

Next, at step S33 or step S36, it is determined whether the ST1 code enters in case of the one-dimensional code or the ST2 code in case of the two-dimensional code. When these independent mode starting signals do not enter, the program proceeds to step S34 or step S37, where it is determined whether an EOL code indicative of the end of one line enters. If the EOL code does not enter, the program returns to step S32 or step S35 and the above-described decoding processing is continued.

If the ST1 code or ST2 code is found to enter at step S33 or step S36, the program proceeds to step S38, at which the decoding-stop signal 73 is outputted to the serial-parallel converter 71 and multiplexer 72 and the decoding processing of the entering code data 75 is halted. As a result, the parallel-serial converter 71 starts decoding the independent code and the multiplexer 72 is changed over to select the outputs of the parallel-serial converter 71. The program then proceeds to step S39, at which it is determined, in response to entry of the line-end signal 76 from the parallel-serial converter 71, whether the decoding of one line has ended. When the end of decoding of one line is sensed in response to entry of the line-end signal 76, the program proceeds to step S40 and the decoding-stop signal 73 is turned OFF.

Figure 9:
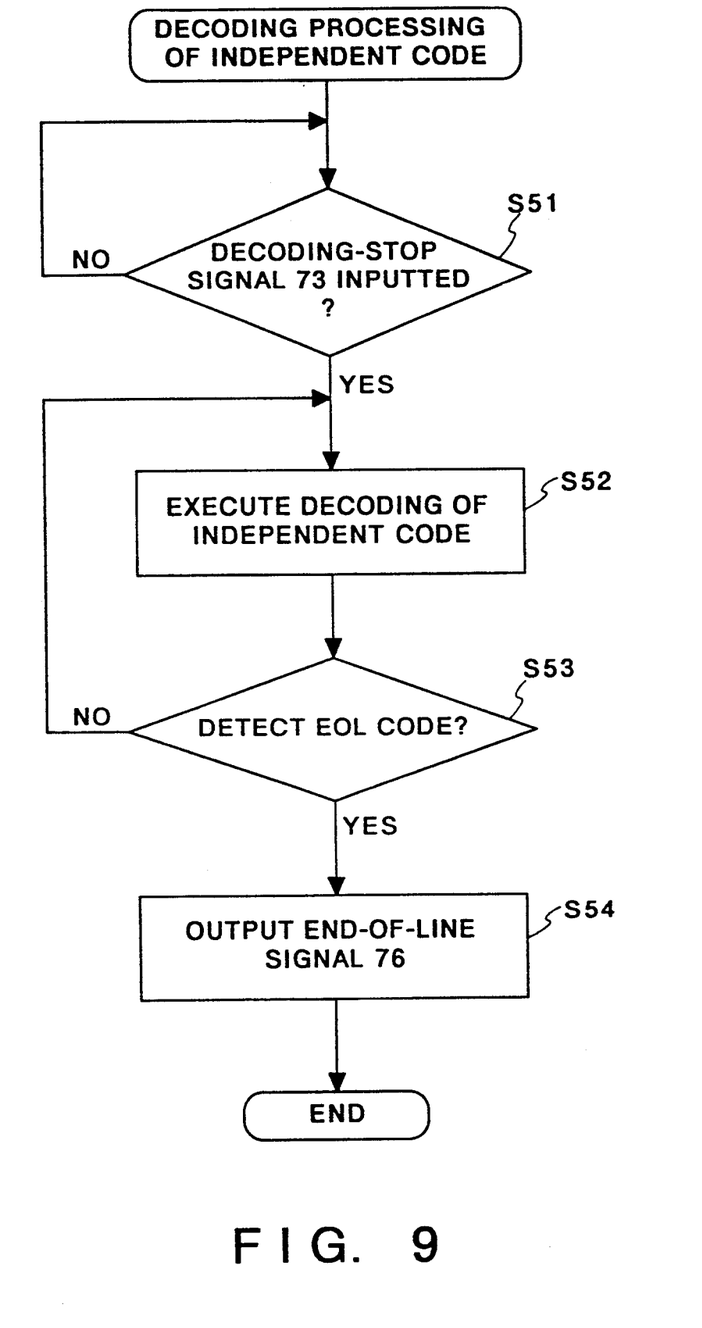
FIG. 9 is a flowchart showing decoding processing of an independent code in a parallel-serial converter.

FIG. 9 is a flowchart illustrating decoding processing in the parallel-serial converter 71.

This processing is started at step S51 in response to entry of the decoding-stop signal 73 from the coder 70. The program proceeds from step S51 to step S52, at which the code data 75 coded by the independent coding mode (RM) is decoded and converted into the original image data. The program then proceeds to step S53, at which it is determined whether the EOL code has entered. If the EOL code has not entered, the program returns to step S52 and decoding processing is continued.

If the EOL code is found to enter at step S53, the program proceeds to step S54, where the line-end signal 76 is delivered to the decoder 70 to inform it of the fact that decoding processing of the present line has ended. As a result, the step S40 of FIG. 8 is executed in the decoder 70. It should be noted that the EOL code is represented by "000000000001". Since the independent code RM is such that the seventh bit is a "1", as described above with reference to FIG. 3, the EOL code is capable of being identified even by the parallel-serial converter 71.

In the embodiment described above, the independent mode starting code ST1 or ST2 is inserted order to distinguish between the MH or MR code and the independent coding mode (RM). However, this does not impose a limitation upon the present invention. Specifically, the decoding side also can be provided with the code length counter 13 to form the condition for effecting the transition to the independent coding mode, used at the time of coding, when the code resulting from coding is received and decoded, as in the foregoing embodiment. The value of this code length counter would be set to a value the same as that of the counter 13 on the coding side. This will make it possible to recognize the beginning of the independently coded data also on the decoder side, and therefore decoding can be performed without using the automatic mode starting code such as ST1 or ST2. Thus, since the length of one line of coded data can be counted and the starting position of the automatic code recognized also at the time of decoding processing, it is unnecessary to insert the automatic mode starting code (ST1, ST2), as is done in this embodiment.

Further, though the present embodiment illustrates a case where an independent code is subjected to a serial-to-parallel data conversion, the invention is not limited to such an arrangement. In a case where the compression efficiency is not raised by one- or two-dimensional coding, it is of course permissible to employ any coding method so long as it is capable of realizing a higher compression efficiency.

With the independent mode coding methods of the embodiment described above, coding is performed by seven-bit image data inclusive of the final pixel at the end of one line, and therefore an invalid image of a maximum of six bits is included. Accordingly, at the time of decoding processing, an image will be judged to be an error image except when the length of the original image data resulting from decoding is equal to a predetermined length, with regard to a line coded solely by or ordinary MH or MR coding. However, with regard to a line in which the aforementioned independent coding modes are used, it is required that the condition for this error judgment be allowed within a range of from +6 to −0 of a predetermined value.

In accordance with the present embodiment, as described above, an image line whose compressibility would greatly decline with MH or MR coding is coded in accordance with another coding mode, thereby raising the compressibility of image data. As a result, if, by way of example, a changeover is made to the independent coding mode when the value in the code length counter 13 becomes equal to that corresponding to one line of original image data, thereby increasing the length of the code resulting from coding by MR coding to six times that of the original image data, then MR coding will be performed up to a point 1/6 from the beginning of one line, and the remaining 5/6 will be coded in accordance with the independent coding mode.

In the case of this embodiment, seven pixels are represented by an eight-bit code. Therefore, we have $$\frac{1}{6} \times 6 \text{ (times)} + \frac{5}{6} \times \frac{8}{7} = 1 + \frac{20}{21}$$

so that the increase can be held to a twofold increase at worst.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus comprising:
generating means for generating image data in line units;
first coding means for sequentially coding the image data by a first coding method;
second coding means for sequentially coding the image data by a second coding method different from the first coding method;
decision means for accumulatively counting the amount of code as each line of image data is coded by said first coding means and for deciding whether the amount of code of each line exceeds a predetermined amount while each line of image data is being coded; and
control means for controlling said apparatus to start coding for each line of image data by said first coding means and to change over from coding by said first coding means to coding by said second coding means in the middle of coding for a line of image data by said first coding means, based on the decision of said decision means;
wherein when the amount of code exceeds the predetermined amount while one line of image data is being coded, the line is coded by said first coding means until the amount of code exceeds the predetermined amount, and after the amount of code has exceeded the predetermined amount, the remainder of the line is coded by said second coding means.

2. The apparatus according to claim 1, further comprising code generating means for generating an identification code for identifying the code resulting from coding by said first coding means and the code resulting from coding by said second coding means, wherein when the amount of code exceeds the predetermined amount, said control means causes said code generating means to output the identification code and changes over to coding by said second coding means.

3. The apparatus according to claim 1, wherein said first coding means codes the image data by a one-dimensional coding method.

4. The apparatus according to claim 1, wherein said first coding means codes the image data by a two-dimensional coding method.

5. A facsimile apparatus comprising:
generating means for generating image data in line units;
first coding means for sequentially coding the image data by a first coding method;
second coding means for sequentially coding the image data by a second coding method different from the first coding method;
decision means for accumulatively counting the amount of code as each line of image data is coded by said first coding means and for deciding whether the amount of code of each line exceeds a predetermined amount while each line of image data is being coded;
coding control means for controlling said apparatus to start coding for each line of image data by said first coding means and to change over from coding by said first coding means to coding by said second coding means in the middle of coding for a line of image data by said first coding means, based on the decision of said decision means, wherein when the amount of code exceeds the predetermined amount while one line of image data is being coded, the line is coded by said first coding means until the amount of code exceeds the predetermined amount, and after the amount of code has exceeded the predetermined amount, the remainder of the line is coded by said second coding means;
first decoding means for decoding the image data coded by the first coding method;
second decoding means for decoding the image data coded by the second coding method;
discriminating means for discriminating between a code resulting from coding by the first coding method and a code resulting from coding by the second coding method; and
decoding control means for performing control in such a manner that, independence upon the results of discrimination made by said discriminating means, a changeover is made between said first and second decoding means to decode the coded image data.

6. The apparatus according to claim 5, further comprising code generating means for generating an identification code for identifying the code resulting from coding by said first coding means and the code resulting from coding by said second coding means, wherein when the amount of code exceeds the predetermined amount, said control means causes said code generating means to output the identification code and changes over to coding by said second coding means.

7. The apparatus according to claim 5, wherein said first coding means codes the image data by a one-dimensional coding method.

8. The apparatus according to claim 5, wherein said first coding means codes the image data by a two-dimensional coding method.

9. The apparatus according to claim 6, wherein said discriminating means discriminates, based upon the identification code upon the identification code, whether a code has been coded by said first coding method or said second coding method.

10. A coding apparatus for coding image data, comprising:
  input means for inputting image data in line units;
  first coding means for sequentially coding the image data by a coding method defined by a CCITT standard;
  second coding means for sequentially coding the image data by a coding method not defined by a CCITT standard;
  decision means for accumulatively counting the amount of code as each line of image data is coded by said first coding means and for deciding whether the amount of code of each line exceeds a predetermined amount while each line of image data is being coded; and
  control means for controlling said apparatus to start coding for each line of image data by said first coding means and to change over from coding by said first coding means to coding by said second coding means in the middle of coding for a line of image data by said first coding means, based on the decision of said decision means;
  wherein when the amount of code exceeds the predetermined amount while one line of image data is being coded, the line is coded by said first coding means until the amount of code exceeds the predetermined amount, and after the amount of code has exceeded the predetermined amount, the remainder of the line is coded by said second coding means.

11. The coding apparatus according to claim 10, wherein said second coding means codes the image data into a code using the image data.

12. The coding apparatus according to claim 10, further comprising code generating means for generating an identification code for identifying the code resulting from coding by said first coding means and the code resulting from coding by said second coding means, wherein when the amount of code exceeds the predetermined amount, said control means causes said code generating means to output the identification code and changes over to coding by said second coding means.

13. A coding apparatus for coding image data, comprising:
  input means for inputting image data in line units;
  first coding means for sequentially coding the image data by a predetermined compressing coding method;
  second coding means for sequentially coding the image data by a coding method using non-compressing codes;
  decision means for accumulatively counting the amount of code as each line of image data is coded by said first coding means and for deciding whether the amount of code of each line exceeds a predetermined amount while each line of image data is being coded; and
  control means for controlling said apparatus to start coding for each line of image data by said first coding means and to change over from coding by said first coding means to coding by said second coding means in the middle of coding for a line of image data by said first coding means, based on the decision of said decision means;
  wherein when the amount of code exceeds the predetermined amount while one line of image data is being coded, the line is coded by said first coding means until the amount of code exceeds the predetermined amount, and after the amount of code has exceeded the predetermined amount, the remainder of the line is coded by said second coding means.

14. The coding apparatus according to claim 13, further comprising code generating means for generating an identification code for identifying the code resulting from coding by said first coding means and the code resulting from coding by said second coding means, wherein when the amount of code exceeds the predetermined amount, said control means causes said code generating means to output the identification code and changes over to coding by said second coding means.

* * * * *

UNITED STATES PATENT AND TRADEMARK OFFICE
CERTIFICATE OF CORRECTION

PATENT NO. : 5,291,303           Page 1 of 2
DATED : March 1, 1994
INVENTOR(S) : YUJI ISHIKAWA It is certified that error appears in the above-identified patent and that said Letters Patent is hereby corrected as shown below:

ON TITLE PAGE

In [56] References Cited, under U.S. PATENT DOCUMENTS, insert:

```
--4,775,893  10/1988  Ishikawa ......... 358/261.1
  4,819,079   4/1989  Takao ............ 358/260
  4,969,052  11/1990  Ishida et al. .... 358/457--.
```

COLUMN 4

Line 46, "unit 28" should read --unit 15--.

COLUMN 6

Line 25, "terminal" should read --terminate--.

COLUMN 8

Line 25, "order" should read --in order--.
Line 64, "or" should read --an--.

UNITED STATES PATENT AND TRADEMARK OFFICE
CERTIFICATE OF CORRECTION

PATENT NO. : 5,291,303
DATED : March 1, 1994
INVENTOR(S) : YUJI ISHIKAWA

It is certified that error appears in the above-identified patent and that said Letters Patent is hereby corrected as shown below:

COLUMN 10

Line 44, "independence" should read --in dependence--.
Line 66, "code upon the identification code," should read --code,--.

Signed and Sealed this

Sixteenth Day of August, 1994

Attest:

BRUCE LEHMAN

Attesting Officer

Commissioner of Patents and Trademarks